US012723866B2

(12) United States Patent
Prusseit et al.

(10) Patent No.: US 12,723,866 B2
(45) Date of Patent: Sep. 1, 2026

(54) OPTICAL DISTANCE SENSOR WITH CLOSED-LOOP EXPOSURE CONTROL AND CORRESPONDING METHOD

(71) Applicant: MICRO-EPSILON Optronic GmbH, Langebrueck (DE)

(72) Inventors: Steffen Prusseit, Dresden (DE); Lars Tobeschat, Dresden (DE)

(73) Assignee: MICRO-EPSILON Optronic GmbH, Langebrueck (DE)

( * ) Notice: Subject to any disclaimer, the term of this patent is extended or adjusted under 35 U.S.C. 154(b) by 924 days.

(21) Appl. No.: 18/002,831

(22) PCT Filed: May 7, 2021

(86) PCT No.: PCT/DE2021/200061
§ 371 (c)(1),
(2) Date: Dec. 21, 2022

(87) PCT Pub. No.: WO2022/008009
PCT Pub. Date: Jan. 13, 2022

(65) Prior Publication Data

US 2023/0243637 A1 Aug. 3, 2023

(30) Foreign Application Priority Data

Jul. 7, 2020 (DE) ..................... 10 2020 208 526.9
Jul. 20, 2020 (DE) ..................... 10 2020 209 065.3

(51) Int. Cl.
*G01B 11/02* (2006.01)

(52) U.S. Cl.
CPC .................................. *G01B 11/026* (2013.01)

(58) Field of Classification Search
CPC ............................... G01B 21/045; G03B 7/08
See application file for complete search history.

(56) References Cited

U.S. PATENT DOCUMENTS 6,822,681 B1 * 11/2004 Aoki ..................... G01S 17/894 356/5.01
9,921,312 B2 3/2018 Takano
(Continued)

FOREIGN PATENT DOCUMENTS

| DE | 20 2019 105 903 U1 | 1/2021 |
|---|---|---|
| EP | 3 165 874 A1 | 5/2017 |
| WO | WO 2014097539 A1 | 6/2014 |

OTHER PUBLICATIONS

International Search Report for Application No. PCT/DE2021/200061, date of mailing Aug. 19, 2021, 2 pages.
(Continued)

*Primary Examiner* — Helal A Algahaim
*Assistant Examiner* — Clara G Chilton
(74) *Attorney, Agent, or Firm* — Seed Intellectual Property Law Group LLP

(57) ABSTRACT

An optical distance sensor with closed-loop exposure control comprises a light source that generates and guides an illumination light beam to a measured object. A detector detects a measuring light beam caused by reflection of the illumination light beam at the measured object. A measurement controller controls the detector during detection of the measuring light beam and readout of measurement values. In one phase of a measurement operation, an evaluation unit evaluates the measurement values for determining a distance between the distance sensor and the measured object. A closed-loop controller drives the light source, the detector, and/or the measurement controller such that a received amount of light, detected during a shutter time, is in or approaching a target range. The distance sensor emits the illumination light beam and detects the measuring light beam in phases of the measurement operation and in mea-
(Continued)

surement pauses between the phases of the measurement operation.

12 Claims, 6 Drawing Sheets

(56) References Cited

U.S. PATENT DOCUMENTS

2007/0052839 A1* 3/2007 Kong .................... H04N 23/71 348/E5.037
2012/0113435 A1 5/2012 Suzuki et al.

OTHER PUBLICATIONS

International Preliminary Report on Patentability and Written Opinion for Application No. PCT/DE2021/200061, date of issuance Jan. 10, 2023, 9 pages.

* cited by examiner $F_{i+2}$
$F_{i+1}$
$F_i$
$T_F$
$T_F$ $F_{i+1}$
1
1
1
$F_i$

OPTICAL DISTANCE SENSOR WITH CLOSED-LOOP EXPOSURE CONTROL AND CORRESPONDING METHOD

BACKGROUND

Technical Field

The present disclosure relates to an optical distance sensor with closed-loop exposure control, and to a method for closed-loop control of an optical distance sensor.

Description of the Related Art

Optical distance sensors have become established in measuring technology as robust and widely usable sensors. In this case, an illumination light beam is generated by means of a light source and directed to a measured object. The illumination light beam produces a measuring light beam at or in the measured object, in many cases by reflection of the illumination light beam on a surface of the measured object. The measuring light beam is detected by a detector, and a distance between the sensor and the measured object is deduced from measurement values of the detector. As an exemplary embodiment of such optical sensors, reference is made to triangulation sensors, confocal chromatic measuring distance sensors, and interferometric distance sensors.

In the case of a triangulation sensor, the sensor, the illumination light beam, and the measuring light beam form a triangle. In this case, the detector is usually formed by a line or area detector. A measured distance results from an illuminated point on the detector and the sensor geometry.

In the case of a confocal chromatic measuring distance sensor, a chromatic aberration, usually a longitudinal chromatic aberration, is deliberately caused in the multi-chromatic illumination light beam. The spectral portion, the focal point of which is arranged close to the reflecting surface of the measured object, generates a peak in the spectrum of the measuring light beam, which can be used to deduce the distance of the surface. In this case, the detector is a spectrometer.

In interferometric sensors, the illumination light beam and the measuring light beam are superimposed, and interference is thereby generated. Distance changes between sensor and measured object lead to changes in the interference pattern, the evaluation of which allows conclusions to be drawn about a change in distance.

For a consistently high measurement accuracy, it is important that the number of photons arriving at the detector with the measuring light beam per unit time is within a relatively narrow tolerance range, for example between 75% and 85% of a saturation limit of the detector, or between 60% and 80% of the saturation limit, or between 85% and 95% of the saturation limit. If the photon count per unit of time is too high, detector elements can become saturated so that an illuminated point on the detector can no longer be sharply delimited. In the case of an excessively low photon count per unit of time, the generated measurement signal can lie close to a detection threshold and can be lost in the noise. A relatively narrow tolerance range thus ensures effective use of the sensor dynamics and a good signal-to-noise ratio (SNR).

The problem is that the number of photons arriving at the detector depends on many boundary conditions. In addition to the intensity of the illumination light beam and its pulse duration, the reflectivity of the measured object has an important effect on the number of incident photons. The reflectivity is dependent, for example, on the surface properties of the measured object, the orientation of the surface relative to the illumination light beam, and its color. Rough surfaces or object edges produce a significantly more scattered measuring light beam than smoother surfaces. Dark surfaces absorb parts of the illumination light beam and thus generate a measuring light beam of lower intensity than bright surfaces. These examples show that the measuring light beam can vary greatly even with a constant illumination light beam. This means that closed-loop exposure control is required.

A particular challenge is the measurement of moving objects, for example on an assembly belt, since the reflectivity of moving objects can change rapidly. This requires a particularly rapid closed-loop exposure control. In the time until a stable control state is restored, the variance of the measurement values—and thus the associated errors—is very high in the interim and then decreases exponentially. In the case of a real-time measurement, numerous measurement values with a high measurement error are thereby generated and output.

An adaptation of the shutter time of the detector is known in practice to achieve the most ideal exposure of the detector. During the shutter time, the detector collects photons which arrive at the detector from the measuring light beam and other light (for example background light). Depending on the number of collected photons, a property of the detector changes, for example a charge quantity stored in a detector element. At the end of the shutter time, the detector is read out and reset. The sum of shutter time and readout duration defines a maximum possible frame rate. The frame rate defines the number of individual frames generated per time period.

In a known variant of the adjustment of the shutter time, a fixed frame rate is set, and the shutter time is adjusted within this frame rate as a function of the reflectivity of the measured object. This has the advantage that a downstream system is supplied synchronously with measurement values.

In another known variant, a flexible frame rate is applied, which is composed of a flexible shutter time as a function of the reflectivity of the measured object and a constant readout duration. The advantage here is a very high frame rate with the disadvantage that a downstream system receives measurement values asynchronously and thus arrhythmically and, in particular in the case of moving objects, a spatial measurement reference is only possible with difficulty.

The disadvantage of both variants is the fact that it takes a long time for the closed-loop control to settle. This is due to the fact that the closed-loop control becomes effective only with a time delay. In a first time window, a measurement value is recorded by the detector, and a new shutter time is calculated in a second time window from a read-out measurement value. This means that the new shutter time is only used in a third time window. The closed-loop exposure control therefore always leads to the ideal shutter time by at least two time windows, which has a negative effect in particular in the case of strong changes in the reflectivity. Since a poor SNR results in the case of under- or overexposed detector elements, this leads to a large scattering width and thus measurement uncertainty of the measuring system.

Another approach is known from EP 3 165 874 A1. To avoid saturation of the detector, several saturation stages are introduced. The detector is illuminated in a predefined detection sequence, wherein the detection sequence is divided into a plurality of subsequences. In each subsequence, a higher saturation limit is defined than in the preceding subsequence. In this case, the illumination durations and saturation limits are defined such that the charge at the end of the detection sequence is below saturation in each pixel. A disadvantage of this is that special detectors are required.

BRIEF SUMMARY AND GENERAL DESCRIPTION

The present disclosure provides an optical distance sensor and a method of the type mentioned at the outset in such a way that a rapid closed-loop control of the exposure of the detector can be achieved with the lowest possible influence on the quality of generated distance measurement values.

In at least one embodiment, the distance sensor comprises:

- a light source for generating an illumination light beam and for guiding the illumination light beam to a measured object,
- a detector for detecting a measuring light beam that has been caused by reflection of the illumination light beam at the measured object,
- a measurement controller for controlling the detector when the measuring light beam is detected and when measurement values are read out,
- an evaluation unit which is designed, in a phase of a measurement operation, to evaluate measurement values of the detector for the purposes of determining a distance between the distance sensor and the measured object, and
- a closed-loop controller which drives the light source, the detector and/or the measurement controller such that a received amount of light, which is detected during an exposure duration by the detector or a portion of the detector, is situated in a target region or approaches said target region,
- wherein the distance sensor is designed, both in phases of the measurement operation and in measurement pauses formed between the phases of the measurement operation, to emit an illumination light beam and to detect a measuring light beam and to evaluate the latter by way of the closed-loop controller.

In at least one embodiment, a method according to the present disclosure uses a distance sensor which comprises a light source and a detector, by which a distance from a measured object is determined in phases of a measurement operation. This method comprises steps of:

- generating an illumination light beam from the light source and directing the illumination light beam onto a measured object,
- detecting, by the detector, a measuring light beam caused by reflection of the illumination light beam on the measured object,
- reading out measurement values of the detector, wherein the readout is controlled by a measurement controller, and
- determining a received amount of light detected during an exposure duration by the detector or by a portion of the detector,
- wherein, both in phases of the measurement operation and in measurement pauses formed between the phases of the measurement operation, an illumination light beam is generated and directed to the measured object, and a measuring light beam is detected and evaluated by way of a closed-loop controller, and
- wherein the light source, the detector and/or the measurement controller is/are driven by the closed-loop controller in such a way that the received amount of light is located in a target region, or approaches the target region.

In accordance with the present disclosure, it has firstly been recognized that the maximum possible sampling rate of a distance sensor is rarely required and/or used in practice. Rather, distance sensors are frequently operated at a reduced sampling rate in practice, so that in each case more or less pronounced measurement pauses arise between phases of a measurement operation. To accelerate the closed-loop control, it would be conceivable to increase the sampling rate and thus reduce the measurement pauses. However, this leads to an unnecessary effort which wastes valuable resources and negatively influences the energy consumption. If the distance values are not immediately rejected again, they would have to be stored, which would significantly load the memory space that is usually very limited. Nevertheless, it has been recognized that the use of the measurement pauses is an effective way to accelerate the closed-loop control.

In accordance with the present disclosure, an illumination light beam is emitted not only in one phase of the measurement operation, but also in the case of one or more intermediate measurements during a measurement pause which is formed between successive phases of the measurement operation. In the case of an intermediate measurement, an illumination light beam is emitted, a measuring light beam is detected, and the detector is read out, as would also take place in the case of a phase of the measurement operation. However, read-out measurement values of the detector are only evaluated for closed-loop control and are not used for determining a distance. This avoids unnecessary computing effort by way of a distance-related evaluation of the measurement values. As a result of the additional function of the additional measurements, additional measurement values can be obtained for the control, which also allow a tracking of the closed-loop control in measurement pauses and nevertheless can avoid a waste of resources. In spite of the time delay that still exists between generating and utilizing a measurement value, the closed-loop control achieves a stable closed-loop control state faster, since adjustments of the closed-loop control take place at a higher rate without the calculation of unnecessary distance values being required.

A distance sensor according to the present disclosure which realizes this basic concept comprises a light source, a detector, a measurement controller, an evaluation unit, and a closed-loop controller. The light source generates an illumination light beam and guides it to a measured object. The detector detects a measuring light beam which has been caused by reflection of the illumination light beam at a surface of the measured object. When the measuring light beam is detected, the detector generates a measurement value which can be read out from the detector. The measurement value is usually representative of the number of photons arriving at the detector during a shutter time. The measurement value thus represents a received amount of light which has been detected during the shutter time by the detector or a portion of the detector. The measurement value can be a scalar or a one-dimensional or multidimensional variable.

The evaluation unit is designed to determine a distance by evaluating the measurement values of the detector in a phase of the measuring operation. This can comprise, for example in the case of a triangulation sensor, the determination of a maximum amount of light and the assignment of the maximum amount of light to a distance.

The measurement controller controls the detector, in particular during detection of a measuring light beam and during the readout of measurement values. This can comprise, for example, activating the detector for detecting a light beam and triggering a readout of a measurement value from the detector.

The closed-loop controller controls components of the distance sensor in such a way that a received amount of light, which is detected during a shutter time by the detector or by a portion of the detector, is in a target range or—if it is not in the target range—approaches the target range and preferably reaches it. These controlled components can comprise the light source, the detector, and/or the measurement controller.

Embodiments of the present disclosure can be used in conjunction with a wide variety of optical distance measuring methods. In the optical distance measuring method, an illumination light beam is emitted and a measuring light beam is received and evaluated. This requirement can be fulfilled in many optical distance measuring methods. In at least one embodiment, the distance sensor according to the present disclosure operates according to the principle of a triangulation sensor, wherein a punctiform or linear illumination of the measured object can be used. In another embodiment, the distance sensor according to the present disclosure operates according to the principle of a confocal chromatic measuring distance sensor. In yet another embodiment, the distance sensor according to the present disclosure operates according to the principle of an interferometric distance sensor.

The light source of the distance sensor can also be formed in a wide variety of ways. As exemplary embodiments, reference is made to an LED (light emitting diode), an SLED (superluminescence LED), a laser, in particular a semiconductor laser, a supercontinuum laser or a swept source, to name just a few conceivable light sources. Depending on the embodiment of the distance sensor, the illumination light beam generated by the light source can be monochromatic or polychromatic. In addition to the actual light generator, the light source can also comprise optical components by which the illumination light beam is formed, guided, and/or influenced in some other way. By way of example, reference is made to lenses, beam splitters, mirrors, and prisms.

The evaluation unit, measurement controller, and/or the closed-loop controller can be implemented in a wide variety of ways. In at least one embodiment, these units are implemented by hardware. In another embodiment, these units are implemented by a combination of software and hardware. In this case, the hardware can be formed, for example, by a microprocessor, a microcontroller, a DSP (digital signal processor) and/or an FPGA (field programmable gate array) on which a software program is processed. For this purpose, a RAM (random access memory), a ROM (read only memory), input and output interfaces, analog-to-digital converters, or further peripheral devices can be used.

The closed-loop controller and/or the measurement controller can be designed to signal a phase of a measurement operation or an intermediate measurement to the evaluation unit. In this way, it could be signaled to the evaluation unit whether or not an evaluation of a measurement value with respect to a distance is to be carried out. This information can be transferred to the evaluation unit by way of a trigger input. It is also conceivable for one bit to be set in a register by way of which the evaluation unit signals a processing of existing measurement values.

The "target range" within which the received amount of light is to lie can be defined in various ways. The goal when defining the target range is often that the detector or a portion of the detector does not become saturated. The way in which this is achieved specifically is largely irrelevant. It can be expedient that the target range is normalized to a saturation limit. The target range can be specified as a range of percentages, for example between 75% and 85% of a saturation limit of the detector, or between 60% and 80% of the saturation limit, or between 85% and 95% of the saturation limit, to name only a few conceivable examples. However, the target range can also be defined with a target value and a scattering bandwidth, for example 80%±5%, or 70%±10%, or 90%±5%. The specific definition of the target range may depend on the specific embodiment of the detector and its behavior.

It can also be taken into account that the detector may not exclusively detect the measuring light beam. It is thus conceivable that, in individual measurement situations, background light will enter the detector, which is present in an illuminated space from the use of the distance sensor and cannot be masked out sufficiently well.

It is not crucial for the present disclosure how significant the measurement pauses are. It should merely be possible to achieve at least one intermediate measurement between phases of the measurement operation. Since common detectors usually have a maximum frame rate, this would mean that the actually used frame rate is below the maximum possible frame rate. The maximum possible frame rate can be determined by the sum of the shutter time and the readout duration. The actually used frame rate defines at which frequency a distance is determined per unit of time. In at least one embodiment, the actually used frame rate is relative to the maximum possible frame rate at 50% or below. At a maximum possible frame rate of 10 kHz, for example, this would mean that the actually used frame rate is 5 kHz or below. In another embodiment, the actually used frame rate is at 10% or below relative to the maximum possible frame rate. At a maximum possible frame rate of 10 kHz, this would mean that the actually used frame rate is at 1 kHz or below.

In at least one development, the measurement controller is designed to read out measurement values of the detector asynchronously. This leads to a higher degree of freedom in the control of the components of the distance sensor.

In another development, the measurement controller is designed to read out measurement values of the detector synchronously. In this case, the measurement values can be read out from the detector at a constant time interval.

In yet another development, a synchronous and asynchronous readout can be combined. In at least one embodiment, this can mean that the measurement values which are evaluated for a distance determination by the evaluation unit are synchronous with a constant time interval, while intermediate measurements occur asynchronously in a measurement pause. This offers the advantage that the distance values have a defined time interval from one another, in particular for use in a downstream system which uses the obtained distance values, and that a high degree of freedom exists for the closed-loop control by way of intermediate measurements.

In at least one embodiment, the measurement controller is designed to define an exposure start at which a detection of the measuring light beam commences, depending on a shutter time. This can mean that the exposure start is selected such that the sequence of the shutter time and thus the readout of a measurement value takes place at a defined readout time. Such a defined readout time can be defined, for example, by a time raster which defines a synchronous readout of measurement values. By such a definition of the exposure start, a defined readout time can also be achieved with variable shutter times.

In at least one embodiment, the closed-loop controller is designed to influence an intensity of the illumination light beam in order to provide closed-loop control of the amount of received light. The intensity of the illumination light beam can be an instantaneous value. In the case of a pulsed illumination light beam, this value could define the intensity of the light beam during an activated illumination light beam. In this case, the illumination light beam could change between this intensity value and an intensity of zero.

In at least one embodiment, the closed-loop controller is designed to influence a pulse duration of the illumination light beam in order to provide closed-loop control of the received amount of light. The pulse duration defines how long the illumination light beam is switched on. The longer the pulse duration, the longer a measuring light beam can be caused by the illumination light beam. In this way, the received amount of light can be influenced by simple means.

In at least one embodiment, the closed-loop controller is designed to influence an exposure start of the detector in order to provide closed-loop control of the received amount of light. Influencing the exposure start can optimize the accumulation of received photons. For example, in the case of a pulsed illumination light beam, the exposure start can be synchronized with a pulse. In this way, it can be ensured that photons are collected in a defined manner.

In at least one embodiment, the closed-loop controller is designed to influence the exposure start of the detector in order to provide closed-loop control of the received amount of light. Assuming that a measuring light beam arrives over the entire shutter time, the received amount of light can be increased by increasing the shutter time, or the received amount of light can be reduced by reducing the shutter time. In this way, the received amount of light can be influenced very easily.

The aforementioned embodiments for closed-loop control of the received amount of light can be combined as desired. An error detection component can also be installed which terminates the tests if there is a complete absence of a measuring light beam to increase the received amount of light. In this case, there may be a faulty placement of the distance sensor and/or of the measured object so that the illumination light beam does not produce a receivable measuring light beam.

In at least one embodiment, the distance sensor comprises a readout memory which is designed to store read-out measurement values of the detector. In this case, an analog-to-digital converter can be arranged between the detector and the readout memory, which converts analog measurement values of the detector into digital values. The readout memory can serve as a temporary memory of measurement values. As a result, the detector can already carry out a next measurement, while other components, for example the closed-loop controller or the evaluation unit, read out and/or process the temporarily stored measurement values of the preceding measurement. In this case, it is expedient if the readout memory is large enough so that at least one set of measurement values can be stored. Depending on the type of evaluation, however, it may also be expedient if a plurality of sets of measurement values can be stored in the readout memory. This would make it possible to temporarily store the measurement values of several measurements.

In at least one embodiment, the detector comprises a plurality of detector elements. The plurality of detector elements can be formed in a wide variety of ways. These detector elements should allow a certain local resolution. This can be achieved, for example, by detector elements that are separate from one another and which can detect incident light independently of one another. The plurality of detector elements can be arranged differently. Preferably, the detector elements are arranged in a line or area. In the case of a detector with a plurality of detector elements, the measurement value of the detector can then be one-dimensional or multi-dimensional, that is to say can be formed, for example, by a vector or a matrix.

In this case, a portion for which a received amount of light is determined can be formed by a detector element. When evaluating this portion, the closed-loop controller can determine the detector elements which provide a maximum measurement value over all measurement values of the detector elements. The received amount of light at the detector elements with maximum measurement value can be controlled in closed-loop fashion by the closed-loop controller into the target range.

In at least one embodiment, at least one intermediate measurement is carried out between two successive phases of a measurement operation, wherein an illumination light beam is generated during an intermediate measurement, and a measuring light beam is detected without a distance value being determined.

If several intermediate measurements were possible in a measurement pause, the execution of the next possible intermediate measurement can be made dependent on the expected need for further closed-loop control. If a control difference determined by the closed-loop controller is above a first threshold value, a further intermediate measurement and a further adaptation may be necessary or at least helpful. If a closed-loop control difference determined by the closed-loop controller is below a second threshold value, a further intermediate measurement may be unnecessary and may therefore be skipped. The first threshold value can be greater than or equal to the second threshold value. In this way, the number of intermediate measurements can be kept low.

In at least one development, the number of skipped intermediate measurements can be limited. If a maximum number of skipped intermediate measurements is reached or exceeded, an intermediate measurement can be enforced. It would be conceivable, for example, to set this maximum number to 5 or to 10 skipped intermediate measurements. In this way, a timely readjustment can be achieved even when the reflectivity is changed.

In at least one development, an intermediate measurement can be carried out and cannot be skipped at least when a next phase of a measurement operation is close. What the term "close" specifically means is dependent on the particular application. If very many intermediate measurements are provided and/or the reflectivity frequently changes abruptly, a plurality of timing windows are available immediately before a phase of the measurement operation for performing further intermediate measurements. In a development, at least one last intermediate measurement of a measurement pause in a timing window is carried out immediately before a phase of the measurement operation and is not skipped. In this way, possible deviations of the received amount of light from the target range can be corrected.

In at least one development, a measurement pause can be used not only for closed-loop control of the exposure, but also for adapting an improvement of the measurement value. Therefore, information for an improvement of measurement values can be detected between two successive phases of the measurement operation. In this case, a timing window which would actually be used for an intermediate measurement can be used for determining information for the measurement value improvement. This timing window can also have become free with a sufficiently low closed-loop control difference by skipping an intermediate measurement. The measurement pause can thus still be used for an improvement of the measurement values.

In this case, the measurement value improvement can comprise background masking for correcting an influence of background light. In this case, the background light is understood to mean light that does not originate from the measuring light beam. This light can be formed, for example, by illumination of the space in which the distance sensor is operated. The detection of information for the background masking would then include detecting background light that illuminates the detector in addition to the measuring light beam. To acquire this information, the illumination light beam can be deactivated, thereby ensuring that the detector is illuminated solely by background light. In this case, the exposure can initially be controlled in a closed-loop fashion, and the background light can then be determined.

BRIEF DESCRIPTION OF THE SEVERAL VIEWS OF THE DRAWINGS

There are various possibilities for advantageously configuring and developing the teaching of the present disclosure. In this regard, with the aid of the drawings, reference is made, on the one hand, to the claims and, on the other hand, to the following explanation of preferred exemplary embodiments of the disclosure. Generally preferred embodiments and developments of the teaching are also explained in conjunction with the explanation of the preferred exemplary embodiments of the present disclosure with reference to the drawings. The following are shown in the drawings:

DETAILED DESCRIPTION

With regard to the fact that in practice, the maximum possible sampling rate ($f_{max}$) of a distance sensor is rarely required and also used, in the present disclosure the measurement pauses between two phases of a measurement operation are explicitly used for the adjustment of the detector signal.

Figures 1, 2:
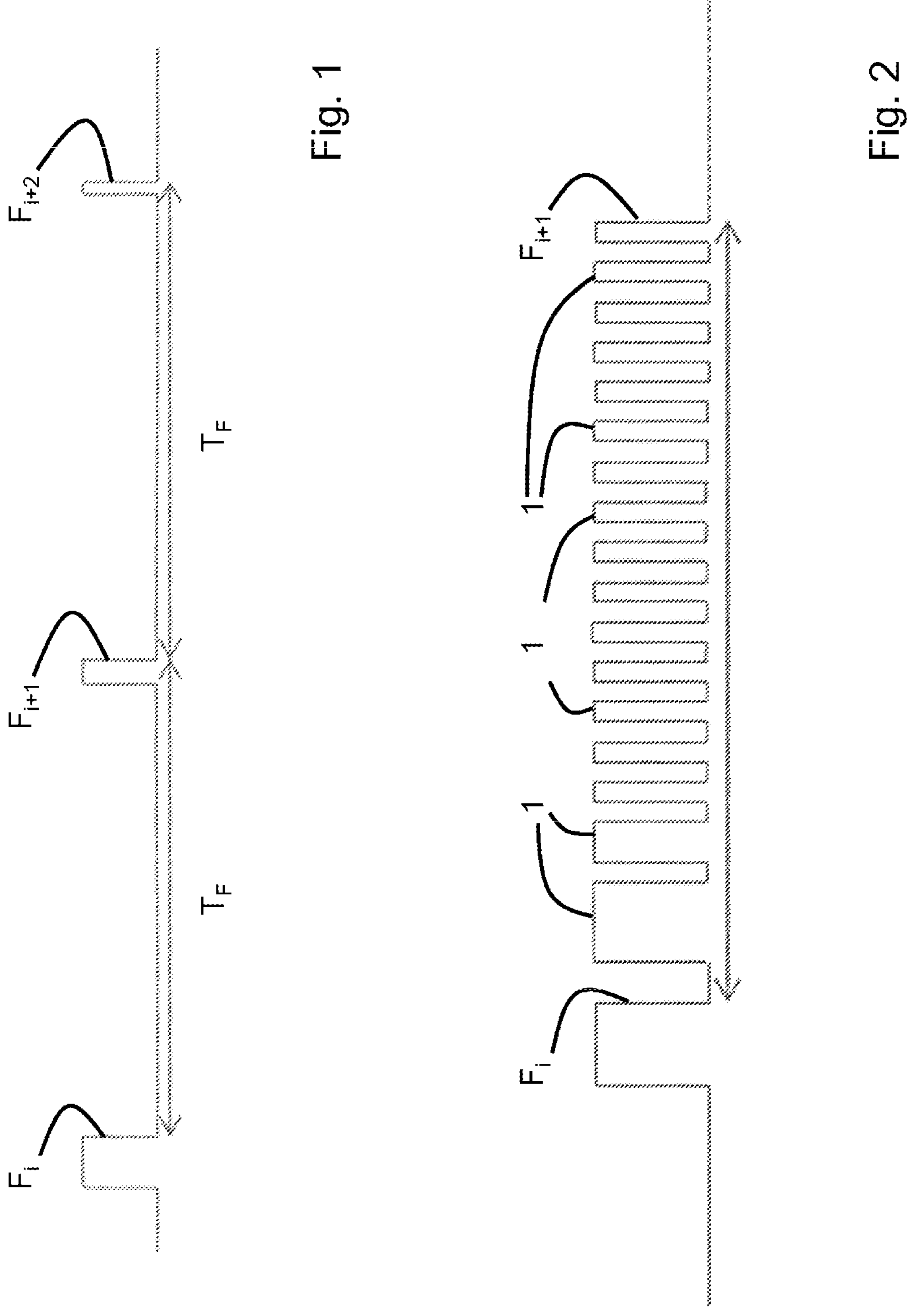
FIG. 1 shows a time diagram with a curve of an exposure of the detector during phases of a measurement operation.
FIG. 2 shows a time diagram with a curve of an exposure of the detector with two phases of a measurement operation and several intermediate measurements which are carried out in a measurement pause between two phases of a measurement operation.

FIG. 1 shows various phases of a measurement operation as "$F_i$," "$F_{i+1}$" and "$F_{i+2}$," wherein i is an index and usually an integer or a natural number. In order to provide the technical advantage of a synchronous distance measurement, the exposure of the detector and the calculation to a distance value are implemented in a common mode in this embodiment. With each falling edge, the detector is read out so that the falling edges are each at a time interval $T_F$, wherein the sampling rate $f_F$ achieved therewith is significantly smaller than the maximum sampling rate $f_{max}$. The exposure start (i.e., the time of a rising edge) is selected corresponding to a determined illumination duration (distance between rising and falling edge). For objects moving uniformly, this choice corresponds to the advantage of an equidistant measurement.

In measurement pauses between the phases of the measurement operation, the optimal shutter time is determined and readjusted by several, ideally asynchronous intermediate measurements (sub-frames). In FIG. 2, a plurality of intermediate measurements 1 (namely a total of 16 intermediate measurements) are shown between "$F_i$" and "$F_{i+1}$", wherein only some are provided with reference signs for reasons of clarity. If a strong change in the reflection property of the measured object occurs, for example by a hard edge contrast, the readjustment of the shutter time initially does not affect the output distance measurement results of the distance sensor since the closed-loop control has a plurality of (intermediate) measurement times to adjust.

In the case shown, it can be seen that the shutter time assumes a constant value after just a few intermediate measurements. This means that further intermediate measurements can be skipped from the fourth intermediate measurement. In this case, the execution of the intermediate measurement could be enforced at least after five skipped intermediate measurements. Furthermore, it would be conceivable that the $16^{th}$, or $15^{th}$ and $16^{th}$, intermediate measurement(s) is/are executed in any case. As a result, even a hard contrast directly before the actual measurement would only lead to a single faulty distance measurement value.

This results in the advantage over the known methods of static measurement with only reduced measurement frequency, and the method with an asynchronous measurement, that the exposure to determine the distance value has a virtually ideal signal-to-noise ratio (SNR). This advantageously significantly narrows the confidence interval of the output measurement value, since statistical outliers in the output distance measurement values can be significantly reduced due to an overexposed or underexposed detector.

Figure 3:
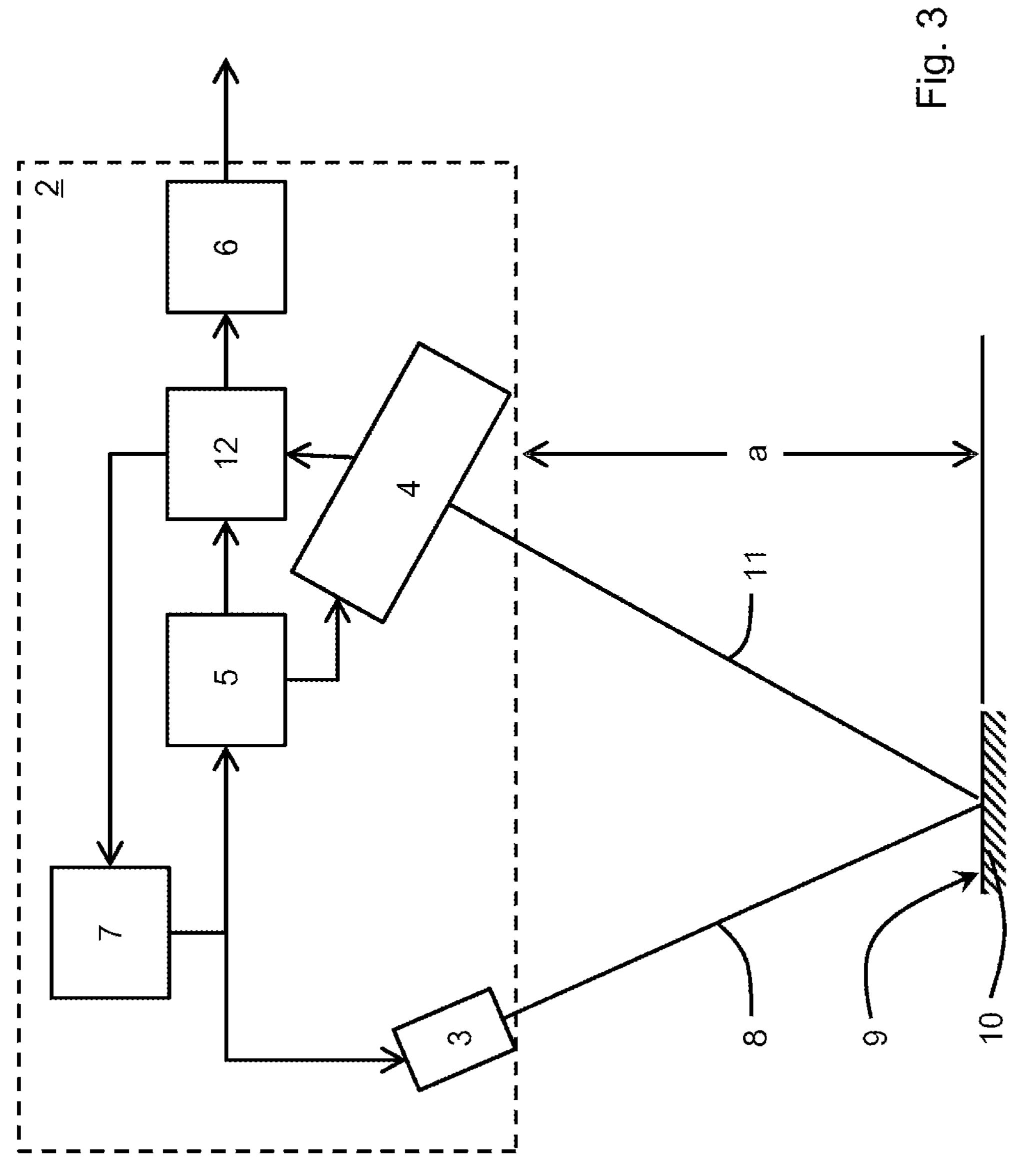
FIG. 3 shows a block diagram with functional units of an exemplary embodiment of a distance sensor according to the present disclosure.

FIG. 3 shows a block diagram of an exemplary embodiment of a distance sensor 2 according to the present disclosure, which operates according to the triangulation principle. The distance sensor 2 comprises a light source 3, a detector 4, a measurement controller 5, an evaluation unit 6, and a closed-loop controller 7. The light source 3 generates an illumination light beam 8 which is guided to a surface 9 of a measured object 10. A measuring light beam 11 is caused by reflection of the illumination light beam 8 on the surface 9. The measuring light beam 11 illuminates one or more detector elements (not shown) of the detector 4. The detector 4 detects the measuring light beam 11 and generates a measurement value, wherein the measurement value is a vector (in the case of a line detector)/a matrix (in the case of an area detector) of several values, and each entry of the vector/matrix corresponds to the measurement value of a detector element. In this case, the detector is controlled by the measurement controller 5, in particular with respect to an exposure start and an shutter time. Ideally, the measurement controller takes over the entire timing of measurement by the detector 4.

If the detector 4 has generated a measurement value, it is stored in a readout memory 12. The evaluation unit 6 and the closed-loop controller 7 can access measurement values stored in the readout memory 12. The evaluation unit 6 uses these measurement values in a phase of the measurement operation for determining a distance a between the distance sensor 2 and the measured object 10. The closed-loop controller 7 determines a received amount of light which has been detected by the detector 4 during a shutter time. The closed-loop controller 7 influences the light source 3 and the measurement controller 5 in such a way that the received amount of light is in a target range or approaches this target range. For this purpose, the closed-loop controller 7 can influence the intensity and the pulse duration of the illumination light beam 8 via the light source 3 and can influence the exposure start and the shutter time via the measurement controller 5.

Figure 4:
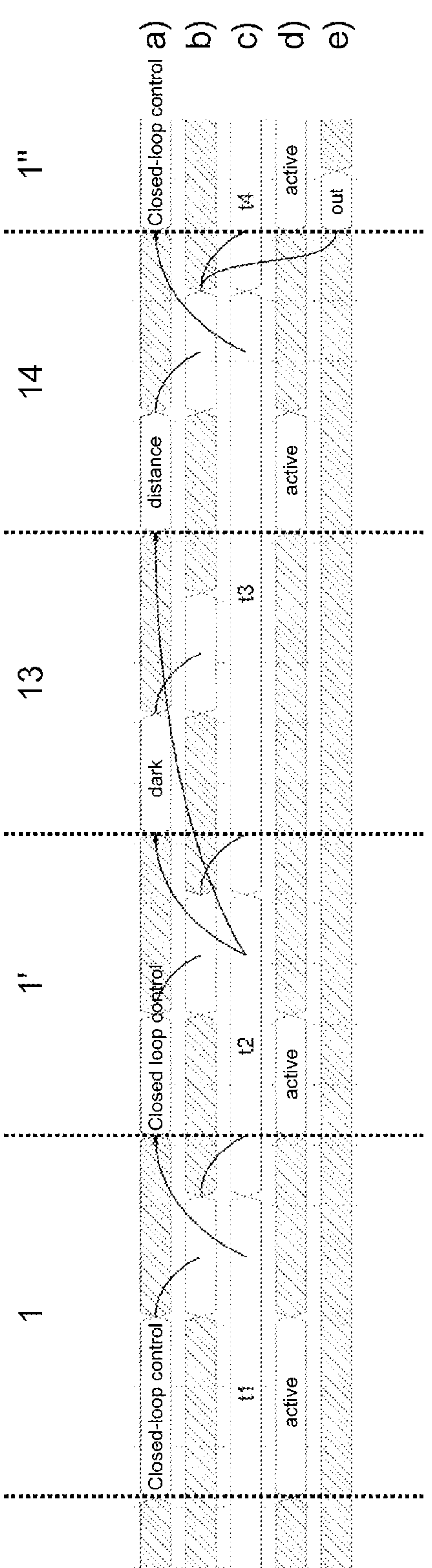
FIG. 4 shows a time diagram with an embodiment of the method according to the present disclosure.

FIG. 4 shows a timing diagram with a detail of an embodiment of a method according to the present disclosure. Two intermediate measurements 1, 1' are shown, a measurement 13 of information for a measurement value improvement, and a phase of the measurement operation 14. In sub-FIG. 4*a* the exposure of the detector 4 is shown, in sub-FIG. 4*b* the readout of the detector 4 is shown, in sub-FIG. 4*c* the use of the readout memory 12 is shown, in sub-FIG. 4*d* the activity of the light source 3 is shown, and in sub-FIG. 4*e* the output of a determined distance value a is shown.

In the intermediate measurements 1, 1', an illumination light beam is emitted (sub-FIG. 4*d*), and the detector is exposed (sub-FIG. 4*a*). At the end of the shutter time, the illumination light beam is deactivated, and the exposure of the detector is ended. The detector is read out (sub-FIG. 4*b*). After readout, the content of the readout memory 12 is updated. As a result, in the case of intermediate measurement 1, the memory content is updated from "t1" to "t2" and, in the case of intermediate measurement 1', from "t2" to "t3". The particular memory content is used during the intermediate measurement 1, 1' and during the phase of the measurement operation 14 for closed-loop control of the exposure, which is indicated by arrows from sub-FIG. 4*c* to sub-FIG. 4*a*.

In the exemplary embodiment shown in FIG. 4, a measurement 13 for measurement value corrections is inserted immediately before the phase of the measurement operation 14. During this measurement 13, the illumination light beam is deactivated, and the amount of light arriving at the detector is detected without the measuring light beam. This means that the detector only detects the background light. The background light detected in this way can be used for correcting measurement values, as explained in more detail in conjunction with FIGS. 5 to 7. The detected measurement values are not transferred into the readout memory, but are directly fed to a brightness calibration.

Following the measurement 13 for measurement value corrections, the actual distance measurement is performed in a phase of the measurement operation 14. For this purpose, an illumination light beam is again emitted, and the detector is illuminated with the measuring light beam. After reading out the measurement value from the detector, the content of the readout memory is updated from "t3" to "t4". This measurement value is used by the evaluation unit 6 to calculate a distance value a. This calculated distance value a is lastly output from the distance sensor (sub-FIG. 4*e*). At the same time, a new intermediate measurement 1" starts.

Figure 5:
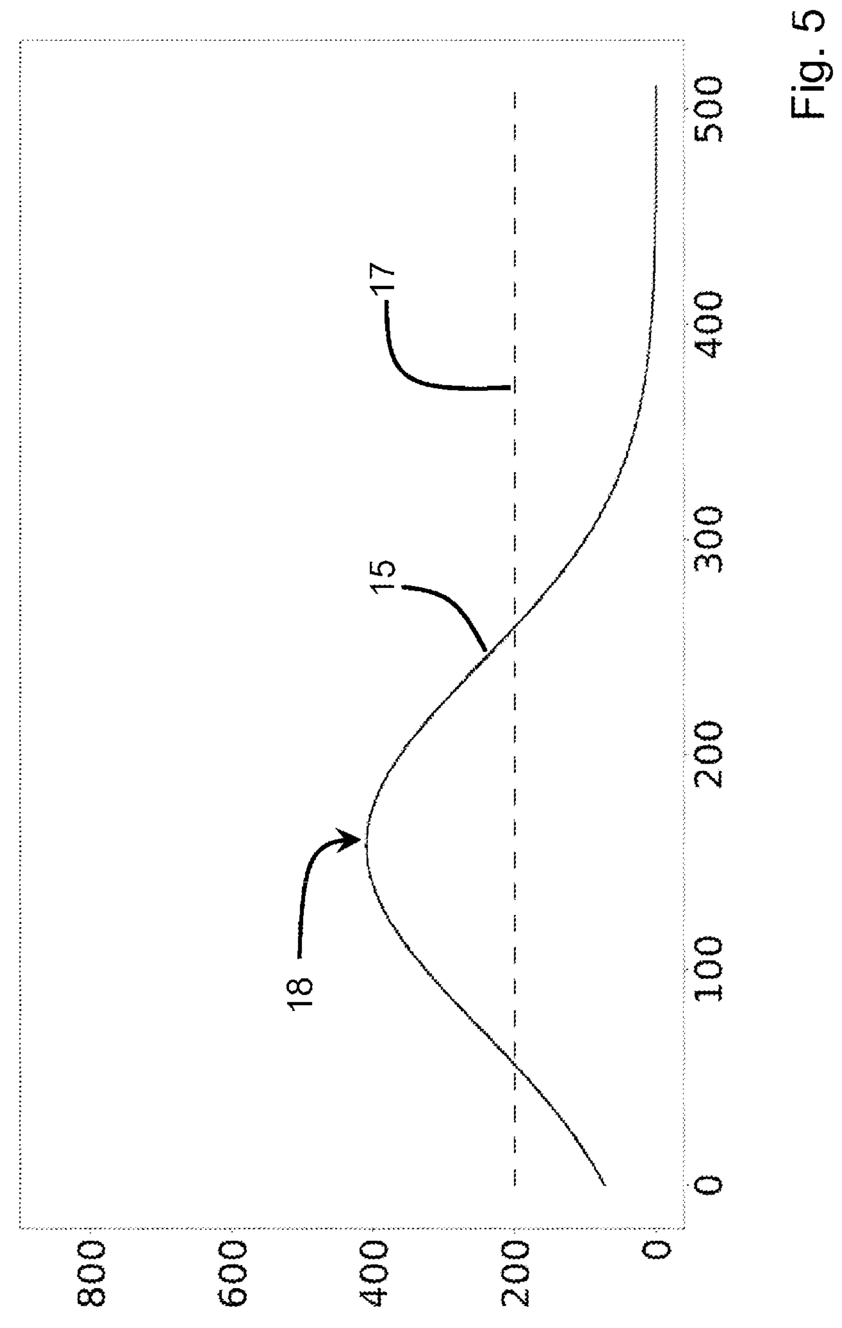
FIG. 5 shows a graph with the intensity in detector elements of the detector with background light and without the measuring light beam.
Figure 6:
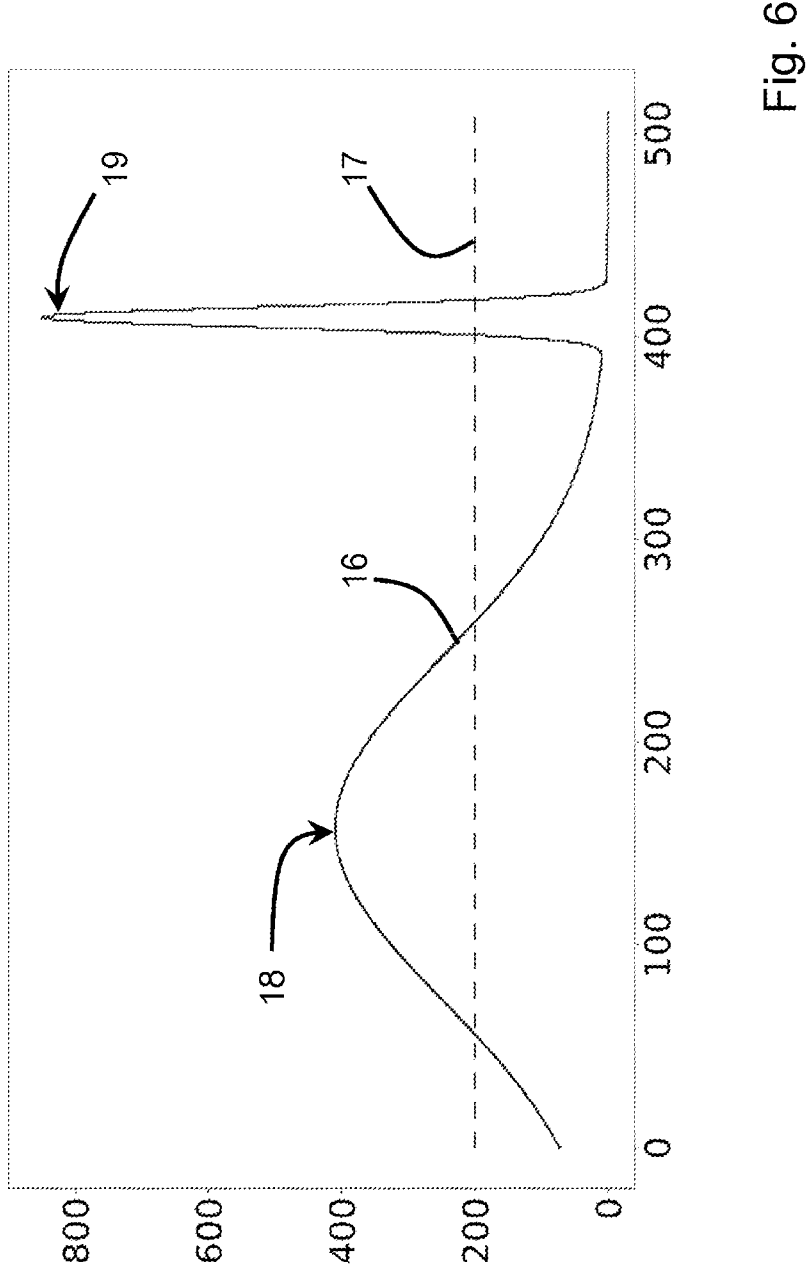
FIG. 6 shows a graph with the intensity in detector elements of the detector with the background light and measuring light beam.
Figure 7:
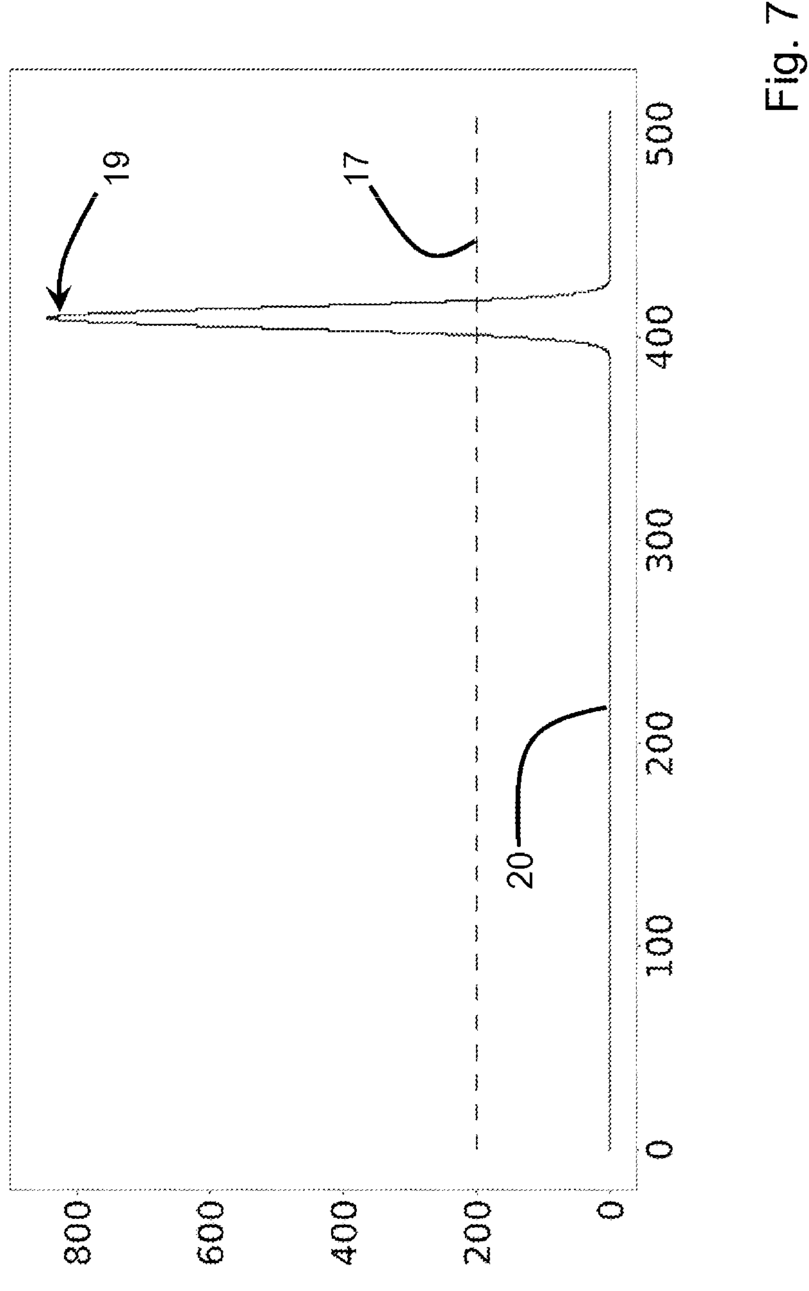
FIG. 7 shows a graph with the intensity in detector elements of the detector with the measuring light beam and corrected by the background light.

FIGS. 5 to 7 represent exemplary curves for a brightness calibration. All figures show intensity values plotted over a pixel index. It is assumed here that the detector is a line detector and has, in the shown example, 500 detector elements (pixels).

FIG. 5 shows an intensity curve 15 for background light without a measuring light beam. FIG. 6 shows an intensity curve 16 for background light and a measuring light beam. In both figures, a threshold value 17 is also shown, which contributes to the detection of a point of incidence of the measuring light beam on the detector. It can be seen that a peak 18 above this threshold value 17 occurs from the background light, as does a peak 19 from the measuring light beam. A measurement value correction is therefore helpful.

During a measurement 13 for obtaining information for a measurement value correction, the intensity distribution 15 can be obtained. Since the illumination light beam is deactivated during the measurement 13, the collected light must originate from the background light. Therefore, an intensity profile 16 which has been detected with an activated illumination light beam can be corrected by subtracting the intensity curve 15. This results in an intensity curve 20 as shown in FIG. 7. In the case of the corrected intensity profile 20, only peak 19 passes over the threshold value 17, and therefore a point of incidence of the measuring light beam on the detector can be clearly identified. A brightness calibration is thus achieved.

With regard to other advantageous embodiments, reference is made to the general part of the description and also to the accompanying claims in order to avoid repetitions.

Finally, it is expressly noted that the exemplary embodiments described in the preceding serve only to explain the claimed teaching, but do not restrict it to the exemplary embodiments.

LIST OF REFERENCE NUMBERS

1, 1', 1" Intermediate measurement
2 Distance sensor
3 Light source
4 Detector
5 Measurement controller
6 Evaluation unit
7 Closed-loop controller
8 Illumination light beam
9 Surface
10 Measured object
11 Measuring light beam
12 Readout memory
13 Measurement for measurement value correction
14 Phase of measurement operation
15 Intensity curve for background light
16 Intensity curve with measuring light beam
17 Threshold value
18 Peak from background light
19 Peak from measuring light beam
20 Corrected intensity profile The various embodiments described above can be combined to provide further embodiments. All of the patent publications referred to in this specification and/or listed in the Application Data Sheet are incorporated herein by reference, in their entirety. Aspects of the embodiments can be modified, if necessary to employ concepts of the various patent publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. An optical distance sensor with a closed-loop exposure control, the optical distance sensor comprising:

a light source for generating an illumination light beam and for guiding the illumination light beam to a measured object, a detector for detecting a measuring light beam that has been caused by reflection of the illumination light beam at the measured object, a measurement controller for controlling the detector when the measuring light beam is detected and when measurement values are read out, an evaluation unit configured, in a phase of a measurement operation, to evaluate measurement values of the detector for determining a distance between the optical distance sensor and the measured object, and a closed-loop controller which drives the light source, the detector, and/or the measurement controller such that a received amount of light, which is detected during a shutter time by the detector or a portion of the detector, is in a target range or approaches the target range, wherein the optical distance sensor is configured, both in phases of the measurement operation and in measurement pauses between the phases of the measurement operation, to emit an illumination light beam, and to detect a measuring light beam, and to evaluate the measuring light beam by the closed-loop controller, wherein at least one intermediate measurement is carried out by the optical distance sensor between two successive phases of the measurement operation, wherein the illumination light beam is generated during an intermediate measurement, and the measuring light beam is detected by the detector without a distance value being determined, wherein the measurement values of the detector that are read during an intermediate measurement are evaluated only for control of the received amount of light and are not used to determine a distance value, and wherein, in a case of a plurality of intermediate measurements, before performing a possible intermediate measurement, the optical distance sensor is configured to check whether a closed-loop control difference determined by the closed-loop controller is above a first threshold value and a further intermediate measurement is thus required, or whether the closed-loop control difference determined by the closed-loop controller is below a second threshold value and a further intermediate measurement is thus unnecessary.

2. The optical distance sensor according to claim 1, wherein the measurement controller is configured to prompt a readout of measurement values of the detector at a constant time interval.

3. The optical distance sensor according to claim 1, wherein the measurement controller is configured to define an exposure start at which a detection of the measuring light beam commences, depending on a shutter time of the detector.

4. The optical distance sensor according to claim 1, wherein the closed-loop controller, for a closed-loop control of the received amount of light, is configured to influence an intensity of the illumination light beam, a pulse duration of the illumination light beam, an exposure start of the detector, and/or a shutter time of the detector.

5. The optical distance sensor according to claim 1, further comprising a readout memory configured to store read-out measurement values of the detector, wherein an analog-to-digital converter can be arranged between the detector and the readout memory.

6. The optical distance sensor according to claim 1, wherein the detector comprises a plurality of detector elements, and wherein a detector element is configured to form a portion of the received amount of light.

7. A method for closed-loop control of an optical distance sensor, wherein the optical distance sensor comprises a light source and a detector, and wherein a distance to a measured object is determined by the optical distance sensor in phases of a measurement operation, the method comprising:

generating an illumination light beam from the light source and directing the illumination light beam onto a measured object, detecting, by the detector, a measuring light beam caused by reflection of the illumination light beam on the measured object, reading out measurement values of the detector, wherein the reading out is controlled by a measurement controller, and determining a received amount of light that is detected during a shutter time by the detector or by a portion of the detector, wherein, both in phases of the measurement operation and in measurement pauses between the phases of the measurement operation, an illumination light beam is generated and directed to the measured object, and a measuring light beam is detected and evaluated by a closed-loop controller, and wherein the light source, the detector, and/or the measurement controller is/are driven by the closed-loop controller such that the received amount of light is in a target range or approaches the target range, wherein at least one intermediate measurement is carried out between two successive phases of the measurement operation, wherein the illumination light beam is generated during an intermediate measurement, and the measuring light beam is detected without a distance value being determined, wherein the measurement values of the detector that are read during an intermediate measurement are evaluated only for controlling the received amount of light and are not used to determine a distance value, and wherein, in a case of a plurality of intermediate measurements, before performing a possible intermediate measurement, the method comprises checking whether a closed-loop control difference determined by the closed-loop controller is above a first threshold value and a further intermediate measurement is thus required, or whether the closed-loop control difference determined by the closed-loop controller is below a second threshold value and a further intermediate measurement is thus unnecessary.

8. The method according to claim 7, wherein an intermediate measurement is performed in a timing window immediately before a phase of the measurement operation in order to correct possible deviations of the received amount of light from the target range.

9. The method according to claim 7, wherein information for an improvement of measurement values is detected between two successive phases of the measurement operation.

10. The method according to claim 9, wherein the measurement value improvement comprises a background masking for correcting an influence of background light, and wherein the detector is exposed to background light to acquire information for the background masking.

11. The method according to claim 10, wherein the detector is exposed to the background light to acquire information for the background masking without the illumination light beam.

12. The optical distance sensor according to claim 6, wherein the detector elements are arranged in a line or area.

* * * * *